Patented June 15, 1948

2,443,303

UNITED STATES PATENT OFFICE 2,443,303

HYDROXYPYRIMIDINE DERIVATIVES

Francis Henry Swinden Curd, Manchester, England, Margaret Isabel Hall (nee Davis), Annan, Scotland, and Edmund Cecil Owen, Francis Leslie Rose, and George Alfred Peter Tuey, Manchester, England, assignors to Imperial Chemical Industries Limited, a corporation of Great Britain No Drawing. Application August 28, 1945, Serial No. 613,216. In Great Britain September 25, 1944

7 Claims. (Cl. 260—251)

This invention relates to the manufacture of ney pyrimidine compounds which are useful as intermediates in the manufacture of chemotherapeutic agents and especially of the parasiticidal agents of copending application Serial No. 613,218 of even date herewith.

The said new compounds are pyrimidine derivatives of the formula—

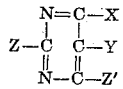

wherein X is hydrogen or a hydrocarbon radical, Y is hydrogen or a neutral substituent, such, for example, as a hydrocarban radical, an alkoxy or aryloxy or alkylmercapto group, or a cyano group, and also X and Y may be joined together to form an alkylene chain, and of the groups Z and Z', one is a hydroxy group, and the other is a substituted amino group of the form —NR''—A—NRR' wherein R'' is hydrogen or an alkyl or simply substituted alkyl group, for example, an alkoxyalkyl or dialkylaminoalkyl group, A is a linking group which is aliphatic or alicyclic or aliphatic-carbocyclic and may be substituted, for example, by hydrocarbon radicals, or alkoxy or dialkylaminoalkyl groups and, where A or part of A is an aliphatic chain, it may be interrupted by oxygen, nitrogen or sulphur atoms and NRR' is an amino or substituted amino group such as acylamino or alkylamino or dialkylamino or piperidino or other strongly basic nitrogen-containing heterocyclic group.

We make the said new compounds by a process comprising the interaction of a 2- or 4-hydroxypyrimidine bearing the groups Y and X in the 5- and 6-positions respectively and in the 4- or 2-position an alkylmercapto or substituted alkylmercapto group, with a diamine NHR''—A—NRR' wherein A, R'' and NRR' have the same meanings as before.

As examples of diamines suitable for use as starting materials there may be mentioned ethylene diamine, 2-dimethylaminoethylamine, 2-diethylaminoethylamine, 3 - dimethylaminopropylamine, 3-diethylaminopropylamine, 3-di-n-butylaminopropylamine, 4-dimethylaminobutylamine, 4-diethylaminobutylamine, 4-di-n-butylaminobutylamine (B. P. 135°–136° C./18 mm. made by sodium and ethanol reduction of 4-di-n-butylaminobutyronitrile itself made by interaction of 4-bromobutyronitrile with dibutylamine), 4-diethylamino-1-methylbutylamine, 5-dimethylamino-n-amylamine, 5 - diethylamino-n-amylamine, 3 - diethylamino - 1:2 - dimethylpropylamine, 6-dimethylaminohexylamine (B. P. 111° C./18mm., made by sodium and ethanol reduction of 6-dimethylaminocapronitrile, itself obtained by interaction of 1:5-dibromopentane with one molecular proportion of sodium cyanide and subsequent interaction of the 6-bromocapronitrile so obtained with dimethylamine), 3-diethylamino, 2-hydroxypropylamine, 2-methylaminoethylamine, 3 - butylaminopropylamine, 2-acetylaminoethylamine, 3 - (β - diethylaminoethoxy)-propylamine, 3 - (β-diethylaminoethylmercapto)-propylamine, 2-pyrrolidinoethylamine, 1:3-bis-diethylamino-2-aminopropane, N-ethyl-N - β - diethylaminoethyl - ethylene diamine, 2-piperidinoethylamine, 2-piperidino - 1 - methylethylamine, 2 - piperidino - n - propylamine, 3-piperidino-n - propylamine, p - diethylaminoethoxy-aniline, p - diethylaminoethylmercaptoaniline, 3 - diethylamino - 2:2 - dimethylpropylamine and N-methyl-N-β-diethylaminoethyl-propylenediamine.

As examples of suitable mercapto compounds there may be mentioned 2-methylmercapto-4-hydroxypyrimidine, 2-methylmercapto - 4 - hydroxy-6-methylpyrimidine, 2 - methylmercapto-4-hydroxy-6- ethylpyrimidine, 2 - methylmercapto-4-hydroxy-6 - phenylpyrimidine, 2 - ethylmercapto-4-hydroxy-6-methylpyrimidine, 2-benzylmercapto-4-hydroxy-6-methylpyrimidine, 2-hydroxy-4-methylmercapto - 6 - methylpyrimidine, 2-methylmercapto-4-hydroxy - 5:6-dimethylpyrimidine, 2-methylmercapto-4-hydroxy-5-ethyl-6-methylpyrimidine, 2 - ethylmercapto - 4 - hydroxy-5-phenylpyrimidine, 2 - ethylmercapto-4-hydroxy-5-methylpyrimidine, 2-ethylmercapto-4-hydroxy-5-phenoxypyrimidine, 2-ethylmercapto-4-hydroxy-5-benzyl-6 - methylpyrimidine, 2-methylmercapto-4 - hydroxy - 5:6:7:8 - tetrahydroquinazoline and 2-methylmercapto - 4 - hydroxy-5:6-trimethylenepyrimidine.

The condensation of the alkylmercaptopyrimidine with the diamine is conveniently brought about by heating the reagants together, optionally in the presence of an inert solvent or diluent, such as β-ethoxyethanol, whereupon the alkylmercaptan is eliminated and the new substituted aminopyrimidine derivative is formed.

Where the diamine used is of the form NH₂—A—NH₂ it is preferable to use an excess thereof to suppress or minimize the unwanted side-reaction wherein one molecular proportion of the diamine combines with two molecular proportions of the pyrimidine derivative.

Where it is desired to introduce a substituent of the form —NR''—A—NH₂ it is necessary to use as the starting material an acylated derivative in which the primary amino group of the diamine has been protected by acylation, to condense this with the 2-alkylmercapto-4-hydroxypyrimidine and then subsequently to remove the acyl group, as by hydrolysis with a dilute mineral acid.

The new pyrimidine derivatives obtained in accordance with this invention are colourless or pale yellow viscous oils or low-melting solids which are soluble in water. They readily form salts with organic and inorganic acids; the picrates, 3:5-dinitrobenzoates and dihydrochlorides, for instance are useful for ready characterization of the compounds. In those compounds wherein the basic substituent contains a primary amino group this can readily be alkylated or converted to a heterocyclic ring such as a piperidino radical by the methods customarily used for effecting such conversions, for example heating with an alkyl iodide or with dimethyl sulphate or pentamethylene dibromide.

The 2-alkylmercapto-4-hydroxy pyrimidines used as starting materials may conveniently be made by interaction of appropriate alkyl isothioureas with formylacetic esters appropriately substituted, where necessary, on the α- and/or β-carbon atoms, or by direct S-alkylation of the 2 - mercapto - 4 - hydroxypyrimidines themselves obtained from thiourea and formylacetic esters appropriately substituted, where necessary, on the α- and/or β-carbon atoms. The alternative starting materials, the 2-hydroxy-4-alkylmercaptopyrimidines may be made from the 2-alkylmercapto - 4 - hydroxy compounds by the following method. The 4-hydroxy group is converted to chloro by treatment with $POCl_3$ and thence, by means of sodium or potassium hydrogen sulphide, to SH; acid hydrolysis of the 2-alkylmercapto group then gives the 2-hydroxy-4-mercapto compound which is S-alkylated (cf. Wheeler and McFarland, American Chemical Journal 1909, 42, 431).

The following examples, in which the parts are by weight, illustrate but do not limit the invention.

*Example 1*

31.2 parts of 2-methylmercapto-4-hydroxy-6-methylpyrimidine and 23.2 parts of β-diethylaminoethylamine are heated together at 160°–180° C. for 3 hours. Rapid evolution of methylmercaptan occurs and a colourless viscous oil is formed. This is substantially pure 2-β-diethylaminoethylamino-4-hydroxy - 6 - methylpyrimidine. The new compound forms a dipicrate which, after crystallization from β-ethoxyethanol, has M. P. 178°–180° C.

By working in a similar manner but using other appropriate diamines instead of the β-diethylaminoethylamine the following further compounds are obtained.

*Example 2*

2-γ-diethylaminopropylamino - 4 - hydroxy-6-methylpyrimidine, dipicrate M. P. 211°–212° C.

*Example 3*

2-δ-diethylaminobutylamino - 4 - hydroxy - 6-methylpyrimidine, dipicrate M. P. 209° C.

*Example 4*

2-γ-dimethylaminopropylamino- 4 -hydroxy-6-methylpyrimidine, dipicrate M. P. 201°–202° C.

*Example 5*

2-γ-dibutylaminopropylamino - 4 - hydroxy-6-methylpyrimidine, dipicrate M. P. 224°–225° C.

*Example 6*

2-γ-piperidinopropylamino - 4 - hydroxy - 6-methylpyrimidine, dihydrate M. P. 81°–82° C., dipicrate M. P. 218° C.

*Example 7*

2-δ-diethylamino - α - methylbutylamino-4-hydroxy-6-methylpyrimidine, dipicrate M. P. 170°–172° C.

*Example 8*

2-γ-butylaminopropylamino - 4 - hydroxy - 6-methylpyrimidine, dipicrate M. P. 200°, bis-3:3-dinitrobenzoate M. P. 193°–194° C.

*Example 9*

2-γ-(β'- diethylaminoethoxy) - propylamino-4-hydroxy-6-methylpyrimidine, dipicrate M. P. 161°–163° C.

*Example 10*

2-γ-(N-methyl-N - β' - diethylaminoethylamino)-propylamino-4-hydroxy - 6 - methylpyrimidine, dipicrate M. P. 205°–207° C. (decomp.).

*Example 11*

2-(N - methyl-N-β-diethylaminoethyl-amino)-4-hydroxy-6-methylpyrimidine, dipicrate M. P. 167°–169° C.

*Example 12*

36.8 parts of 2-methylmercapto-4-hydroxy-5-ethyl-6-methylpyrimidine and 26 parts of γ-diethylaminopropylamine are heated together at 160°–180° C. for 3 hours. Rapid evolution of methylmercaptan occurs and a colourless viscous oil is formed. This is substantially pure 2-γ-diethylaminopropylamino-4-hydroxy - 5 - ethyl-6-methylpyrimidine. The new compound forms a dipicrate which, after crystallisation from ethanol, has M. P. 191°–192° C.

*Example 13*

By working in the same way but using γ-dibutylaminopropylamine instead of the γ-diethylaminopropylamine there is obtained 2-γ-dibutylaminopropylamino-4-hydroxy - 5 - ethyl-6-methylpyrimidine. It forms a monopicrate of M. P. 182°–183° C. and a dipicrate of M. P. 166°–167° C.

*Example 14*

15.6 parts of 2-hydroxy-4-methylmercapto-6-methylpyrimidine and 11.6 parts of β-diethylaminoethylamine are heated together at 160° C. for 2 hours. A homogeneous liquid is formed, methyl mercaptan is evolved and after about half an hour the mass sets solid. The 2-hydroxy-4-β-diethylaminoethylamino-6-methylpyrimidine thus formed may be purified by crystallisation from a mixture of ethanol and ethyl acetate. When pure it melts at 230°–232° C. It forms a dipicrate which crystallises from β-ethoxyethanol in yellow laminae of M. P. 223°–224° C. and a dihydrochloride which crystallises from ethanol in colourless needles of M. P. 258°–260° C. (decomp.).

By working in a similar way but using other appropriate diamines instead of the β-diethylaminoethylamine there are obtained the following further compounds.

Example 15

2-hydroxy-4-γ-diethylaminopropylamino-6-methylpyrimidine, M. P. 183°–184° C., dihydrochloride M. P. 264°–266° C.

Example 16

2-hydroxy-4-δ-diethylamino-α-methyl-butylamino-6-methylpyrimidine The crude material is boiled with benzene and the extract is discarded. The residue, crystallised from ethyl acetate gives a hygroscopic hydrate of M. P. 134°–140° C. The picrate, crystallised from a mixture of ethanol and β-ethoxyethanol has M. P. 181°–182° C.

Example 17

5.7 parts of 2-methylmercapto-4-hydroxy-5:6-dimethylpyrimidine and 7.7 parts of γ-dibutylaminopropylamine are heated together under reflux at 160°–170° C. for 3 hours. The excess of the diamine is then distilled off under diminished pressure and the residue is distilled from a bath at 260°–280°C./10$^{-4}$ mm. There is thus obtained 2-γ-dibutylaminopropylamino-4-hydroxy-5:6-dimethylpyrimidine in the form of a viscous oil. The dipicrate crystallises from alcohol in yellow needles of M. P. 199°–202° C.

Example 18

By working in a similar manner but using 4.3 parts of β-diethylaminoethylamine instead of the γ-dibutylaminopropylamine, there is obtained 2-β-diethylaminoethylamino-4-hydroxy-5:6-dimethylpyrimidine in the form of a pale yellow oil which crystallises when triturated with petroleum ether (B. P. 60°–80° C.). The new compound is recrystallised from petroleum ether and then has M. P. 69°–71° C.

Example 19

17 parts of 2-methylmercapto-4-hydroxypyrimidine and 22.3 parts of γ-dibutylaminopropylamine are heated together at 160°–180° C. for 2 hours. There is a brisk evolution of methyl mercaptan and a colourless viscous oil is formed. This is substantially pure 2-γ-dibutylaminopropylamino-4-hydroxypyrimidine. It forms a dipicrate which after crystallisation from β-ethoxyethanol has M. P. 198°–199° C.

Example 20

46.4 parts of hexamethylene diamine are dissolved in 100 parts of warm β-ethoxyethanol. 31.2 parts of 2-methylmercapto-4-hydroxy-6-methylpyrimidine are added and the mixture is heated to 140°–150° C. for 16 hours. The β-ethoxyethanol is then distilled off in vacuo and the residue is dissolved in 250 parts of hot water. The solution is clarified with charcoal, filtered and cooled. 2-(6'-aminohexylamino)-4-hydroxy-6-methylpyrimidine crystallises out; it has M. P. 118°–121° C.

Example 21

31.2 parts of 2-methylmercapto-4-hydroxy-6-methylpyrimidine are added to a solution of 40 parts of ethylene diamine in 100 parts of β-ethoxyethanol and the mixture is heated to 100°–110° C. for 16 hours. The clear solution so formed is evaporated in vacuo and the residue is dissolved in 230 parts of hot water. A small amount of impurity remains undissolved and is filtered off. The filtrate is evaporated to dryness in vacuo and the residue is thoroughly dried and then crystallised from ethanol. There is thus obtained 2-β-aminoethylamino-4-hydroxy-6-methylpyrimidine of M. P. 176°–177° C.

Example 22

15.6 parts of 2-methylmercapto-4-hydroxy-6-methylpyrimidine and 10.2 parts of monoacetylethylene diamine are heated together at 150°–160° C. for 3 hours. The solid so formed is then crystallised from a mixture of ethanol and ethyl acetate. There is thus obtained 2-β-acetylaminoethylamino-4-hydroxy-6-methylpyrimidine of M. P. 144°–146° C. (decomp.).

The acetyl group can be removed by heating with dilute hydrochloric acid, neutralising with the stoichiometric proportion of caustic soda, evaporating the solution to dryness, extracting the residue with ethanol and concentrating the ethanol solution to crystallisation. There is thus obtained 2-β-aminoethylamino-4-hydroxy-6-methylpyrimidine of M. P. 176°–177° C.

Whereas the above description and examples illustrate many widely varised embodiments of the invention it will be apparent to one skilled in the art that many other embodiments and variations may be devised without departing from the spirit and scope thereof and accordingly it is to be understood that the invention is not in any way limited except as defined in the following claims:

We claim:

1. A compound of the general formula

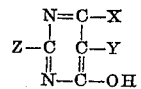

wherein X designates a member of the group consisting of hydrogen and hydrocarbon radicals, Y is a member of the group consisting of hydrogen and hydrocarbon, while Z designates a diamine radical; said diamine radical having the form —NH—A—NRR', wherein NRR' is a strongly basic radical selected from the group consisting of primary, secondary and tertiary amine radicals and heterocyclic nitrogenous base radicals, while A is an organic radical linking the two N-atoms of the diamine and interposing therebetween at least two aliphatic carbon atoms.

2. A compound of the general formula

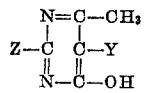

wherein Y is a member of the group consisting of hydrogen and hydrocarbon, Z designates a diamine radical having the form —NH—A—NRR' wherein NRR' is a strongly basic radical selected from the group consisting of primary, secondary and tertiary amine radicals and heterocyclic nitrogenous base radicals, while A is an organic radical linking the two N-atoms of the diamine and interposing therebetween at least two aliphatic carbon atoms.

3. A compound of the general formula

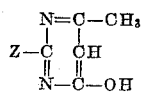

wherein Z designates a diamine radical having the form —NH—A—NRR', wherein NRR' is a strongly basic radical selected from the group consisting of primary, secondary and tertiary amine radicals and heterocyclic nitrogenous base radicals, while A is an organic radical linking the two N-atoms of the diamine and interposing therebetween at least two aliphatic carbon atoms.

4. A compound of the general formula

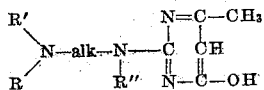

wherein alk designates an alkylene radical which interposes at least 2 and not more than 6 carbon atoms between the two N-atoms, R'' stands for a member of the group consisting of hydrogen and alkyl, while

is a strongly basic radical selected from the group consisting of primary, secondary and tertiary amine radicals and heterocyclic nitrogenous base radicals.

5. A compound of the general formula

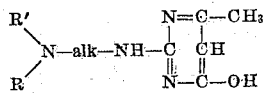

wherein alk designates an alkylene radical which interposes at least 2 and not more than 6 carbon atoms between the two N-atoms, R is a member selected from the group consisting of hydrogen and alkyl, while R' designates an alkyl radical.

6. 2-γ-dibutylaminopropylamino-4-hydroxy-6-methylpyrimidine.

7. 2-γ-dibutylaminopropylamino - 4 - hydroxy-5:6-dimethylpyrimidine.

FRANCIS HENRY SWINDEN CURD.
MARGARET ISABEL HALL (NEE DAVIS).
EDMUND CECIL OWEN.
FRANCIS LESLIE ROSE.
GEORGE ALFRED PETER TUEY.

REFERENCES CITED

The following references are of record in the file of this patent:

American Chemical Journal, vol. 33 (1905), pp. 439 and 449.

Jour. American Chem. Soc., vol. 67 (1945) pp. 1159–61.

Survey of Antimalarial Drugs, vol. 2, part 2, page 1403, (1946).